(12) United States Patent
El Assaad

(10) Patent No.: US 11,668,786 B2
(45) Date of Patent: Jun. 6, 2023

(54) APPARATUS, METHOD AND COMPUTER PROGRAM FOR A MOBILE TRANSCEIVER AND FOR A BASE STATION TRANSCEIVER

(71) Applicant: VOLKSWAGEN AKTIENGESELLSCHAFT, Wolfsburg (DE)

(72) Inventor: Ahmad El Assaad, Wolfsburg (DE)

(73) Assignee: VOLKSWAGEN AKTIENGESELLSCHAFT

( * ) Notice: Subject to any disclaimer, the term of this patent is extended or adjusted under 35 U.S.C. 154(b) by 190 days.

(21) Appl. No.: 17/275,219

(22) PCT Filed: Aug. 29, 2019

(86) PCT No.: PCT/EP2019/073134
§ 371 (c)(1),
(2) Date: Mar. 11, 2021

(87) PCT Pub. No.: WO2020/052990
PCT Pub. Date: Mar. 19, 2020

(65) Prior Publication Data
US 2022/0043104 A1     Feb. 10, 2022

(30) Foreign Application Priority Data

Sep. 11, 2018     (EP) ..................... 18193753

(51) Int. Cl.
*G01S 5/00*     (2006.01)
*G01S 5/12*     (2006.01)
(Continued)

(52) U.S. Cl.
CPC ............... *G01S 5/12* (2013.01); *G01S 1/042* (2013.01); *G01S 3/023* (2013.01); *G01S 3/043* (2013.01);
(Continued)

(58) Field of Classification Search
CPC .......... G01S 5/12; G01S 5/011; G01S 5/0205; G01S 1/042; G01S 3/023; G01S 3/043; H04W 64/003
See application file for complete search history.

(56) References Cited

U.S. PATENT DOCUMENTS 11,255,945 B2 *   2/2022  Markhovsky ........... G01S 19/05
2009/0117916 A1    5/2009  Jo
(Continued)

FOREIGN PATENT DOCUMENTS

DE     102016212136 A1 *   1/2018   .............. G01S 11/02
DE     102016212136 A1       1/2018

OTHER PUBLICATIONS

El Assaad et al.; Highly Accurate Distance Estimation Using Spatial Filtering and GNSS in Urban Environments; 2016 IEEE 84th Vehicular Technology Conference (VTC); Sep. 18-21, 2016.
(Continued)

*Primary Examiner* — Khai M Nguyen
(74) *Attorney, Agent, or Firm* — Barnes & Thornburg LLP

(57) ABSTRACT

An apparatus, method and computer program for a mobile transceiver and for a base station transceiver. The method includes receiving a downlink signal from a base station transceiver of the mobile communication system via a downlink data channel, identifying a line of sight component of at least the first positioning symbol of the downlink signal based on the one or more sequences of zero-value samples and determining information related to a location of the mobile transceiver based on the one or more non-zero-value samples received within the line of sight component of the first positioning symbol. The downlink signal includes one or more positioning symbols having a first positioning symbol, wherein the first positioning symbol is based on
(Continued)

samples in a time domain to be transmitted by the base station transceiver.

16 Claims, 6 Drawing Sheets

(51) Int. Cl.
  *G01S 1/04* (2006.01)
  *G01S 3/02* (2006.01)
  *G01S 3/04* (2006.01)
  *G01S 5/02* (2010.01)
  *H04W 64/00* (2009.01)
(52) U.S. Cl.
  CPC ............ *G01S 5/011* (2020.05); *G01S 5/0205* (2013.01); *H04W 64/003* (2013.01)

(56) References Cited

U.S. PATENT DOCUMENTS

| | | |
|---|---|---|
| 2012/0040684 A1 | 2/2012 | Gao et al. |
| 2012/0040694 A1 | 2/2012 | Zhou et al. |
| 2012/0146841 A1 | 6/2012 | Ookawa |
| 2012/0182180 A1* | 7/2012 | Wolf ......................... G01S 5/14 342/357.29 |
| 2015/0198696 A1 | 7/2015 | Liu |
| 2018/0372879 A1* | 12/2018 | Whitehead ............ G01S 19/215 |
| 2019/0045477 A1* | 2/2019 | Edge ..................... H04W 64/00 |
| 2019/0053013 A1* | 2/2019 | Markhovsky ....... H04L 43/0864 |
| 2019/0339355 A1 | 11/2019 | Nosthoff et al. |

OTHER PUBLICATIONS

Papadimitriou et al.; First IEEE Consumer Communications and Networking Conference (CCNC); 2004; pp. 31-34.
Search Report for European Patent Application No. 18193753.3; dated Mar. 19, 2019.
Search Report and Written Opinion for International Patent Application No. PCT/EP2019/073134; dated Nov. 27, 2019.

* cited by examiner

APPARATUS, METHOD AND COMPUTER PROGRAM FOR A MOBILE TRANSCEIVER AND FOR A BASE STATION TRANSCEIVER

PRIORITY CLAIM

This patent application is a U.S. National Phase of International Patent Application No. PCT/EP2019/073134, filed 29 Aug. 2019, which claims priority to European Patent Application No. 18193753.3, filed 11 Sep. 2018, the disclosures of which are incorporated herein by reference in their entireties.

SUMMARY

Disclosed embodiments relate to an apparatus, a method and a computer program for a mobile transceiver and for a base station transceiver, more specifically, but not exclusively, to a method for determining information related to a location of the mobile transceiver based on one or more positioning symbols embedded within a downlink signal.

BRIEF DESCRIPTION OF THE DRAWINGS

Disclosed embodiments will be described by way of example only and with reference to the accompanying figures, in which.

DETAILED DESCRIPTION

Figure 1A:
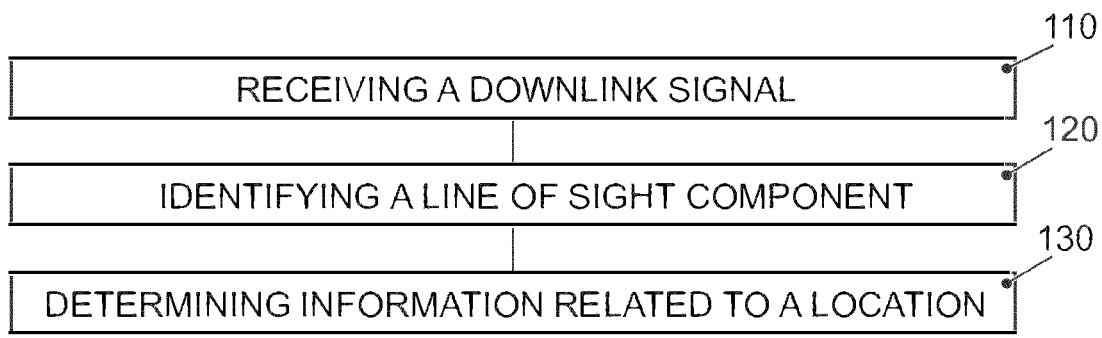
FIG. 1a shows a flow chart of an exemplary embodiment of a method for a mobile transceiver.

Mobile communication systems are a field of research and development. For example, cellular mobile communication systems may comprise one or more base stations, which may offer wireless services to a plurality of mobile devices. As these devices are mobile, their position relative to the base stations may change.

In many cases, mobile devices may be smartphones, tablets, wearable computers etc. In some cases, the mobile devices may be part of bigger entities, e.g., transportation vehicles. For example, a vehicle may be a mobile device, and may be configured to communicate with a base station transceiver. One field of research concerning transportation vehicles is the field of autonomous or coordinated driving of transportation vehicles. Especially in the field of cooperative driving, it may be important to know the exact locations of individual transportation vehicles, e.g., with an absolute accuracy better than 30 cm, and in some cases better than 10 cm. In at least some cases, such exact locations might not be provided by satellite navigation systems, as their resolution and/or their accuracy, e.g., in cities with a dense housing pattern, might not be good enough for cooperative driving operations.

In US patent application US 2009/0117916, a pulse embedded in an orthogonal frequency division multiplexing (OFDM) symbol is used to determine a distance between a mobile device and a base station. The accuracy achievable by the proposed method might not be good enough for coordinated driving operations.

In US, patent applications US 2012/0040694, a time difference of arrival (TDOA) algorithm is used to determine a location of a mobile device, which is based on using signals from at least three base stations. This may require additional communication overhead between the base stations and may in general require a higher number of base stations being present in the vicinity of the mobile device.

In US patent application US 2015/0198696, a positioning reference signal, in addition to a cell-specific reference signal, is used to increase a number of reference signal symbols available for positioning within a subframe. In this patent application, the cell-specific reference signal and the positioning reference signal are correlated to determine a location of a mobile device. Thus, multiple reference signals are required.

German patent application DE 10 2016 212 136 shows a method and apparatus for determining a distance. Assad et al.: "Highly Accurate Distance Estimation Using Spatial Filtering and GNSS in Urban Environments" shows a similar concept. In both disclosures, a transmission signal is temporarily paused and restarted to identify a line of sight-component of the signal, and use the line of sight component to determine the distance.

There may be a desire for an improved method for determining information related to a location of a mobile device, which increases an accuracy of the positioning without interrupting data transmissions.

Disclosed embodiments are based on the finding that a determination of a location of a mobile device (e.g., a mobile transceiver) may be facilitated if a line of sight component of a signal can be identified within a downlink signal based on samples that are isolated in the time domain within the downlink signal. In mobile communication systems, it often is the case that signals received by a mobile transceivers are received from a base station (e.g., a base station transceiver) with effects of multi-path propagation, e.g., with signal echoes caused by obstacles and objects in the vicinity of the base station and the mobile device. If it is known that a line of sight (LOS) component is comprised in the downlink signal, this component can be isolated within the downlink signal by constructing the signal on the base station such that echoes of previous transmissions have ceded and consequently, at a pre-defined time, only background noise and the line of sight component are visible in the downlink signal. This component can then be isolated within the downlink signal and used for positioning, e.g., based on an angle of arrival algorithm that would, without the isolation of the line of sight component, require a large number of antennas on the receiver side to spatially separate the line of sight component. To achieve such a signal, symbols within the downlink signal may be manipulated in the time domain on a sample-per-sample basis within the modulation process. Within a positioning symbol embedded within the downlink signal, one or more sequences of zero-value samples may be included, effectively muting the base station transceiver temporarily. The length of these sequences may be based on the multi-path propagation properties of the vicinity of the base station, and may be chosen such, that a non-zero sample following a sequence of zero-samples is unaffected by multi-path propagation components of the last non-zero sample. The one or more non-zero-value samples may be isolated by the one or more sequences of zero value samples, so that the identification of the line of sight component of the downlink signal is enabled at the mobile transceiver. The samples may be transmitted in an isolated manner in the downlink signal. A symbol may comprise one or more of such combinations of zero-value samples and following non-zero samples, enabling a highly precise determination of the position of the mobile device.

Disclosed embodiments provide a method for a mobile transceiver for a mobile communication system. The method comprises receiving a downlink signal from a base station transceiver of the mobile communication system via a downlink data channel. The downlink signal comprises one or more positioning symbols. The one or more positioning symbols comprise a first positioning symbol. At least the first positioning symbol is based on a plurality of samples in a time domain to be transmitted by the base station transceiver. The plurality of samples comprises one or more sequences of zero-value samples and one or more non-zero-value samples following the one or more sequences of zero-value samples. The method comprises identifying a line of sight component of at least the first positioning symbol of the downlink signal based on the one or more sequences of zero-value samples. The method comprises determining information related to a location of the mobile transceiver based on the one or more non-zero-value samples received within the line of sight component of at least the first positioning symbol. The positioning symbols comprising the one or more sequences of zero-value samples may enable identifying the line of sight component of at least the first positioning symbol. Identifying the line of sight component may enable an improved determination of the information related to the location of the mobile transceiver, which may enable a more accurate determination of the information related to the location even in dense multipath environments.

In at least some exemplary embodiments, the determining of the information related to the location of the mobile transceiver comprises determining an angle of arrival of the line of sight component of at least the first positioning symbol of the downlink signal based on the one or more non-zero-value samples and determining the location of the mobile transceiver based on the angle of arrival of the line of sight component. Determining the location of the mobile transceiver based on the angle of arrival may benefit from the identified line of sight component, and may be performed with a higher accuracy compared to the version when line of sight-samples of the downlink signal overlap with multipath samples on the receiver side.

For example, the one or more positioning symbols may form a positioning slice. The positioning slice may be suitable for a physical layer of the mobile communication system. The positioning slice may be based on the plurality of samples in a time domain to be transmitted by the base station transceiver comprising the one or more sequences of zero-value samples and the one or more non-zero-value samples following the one or more sequences of zero-value samples. The received downlink signal comprising the positioning slice may be suitable for simultaneous communication and highly precise positioning. This may enable a seamless integration of the positioning symbols within the downlink signal.

The method may further comprise determining information related to a time and/or phase synchronization between the mobile transceiver and the base station transceiver based on the one or more non-zero-value samples received within the line of sight component of at least the first positioning symbol. The determining of the information related to the location of the mobile transceiver may comprise determining a distance between the mobile transceiver and the base station transceiver based on the information related to the time/and or phase synchronization. Instead (or in addition) to using an angle-of-arrival-based location determination approach, the line of sight component may also be used to determine a distance between the base station transceiver and the mobile transceiver.

The one or more positioning symbols may comprise a second positioning symbol. The first positioning symbol and the second positioning symbol may be consecutive symbols within the downlink signal. The second positioning symbol may be associated with a zero-value cyclic prefix. The downlink signal may be received via a first antenna module of the mobile transceiver. The method may further comprise transmitting a local calibration signal via a second antenna module of the mobile transceiver within a duration of the zero-value cyclic prefix of the second positioning symbol. The method may further comprise receiving the local calibration signal via the first antenna module. The method may further comprise calibrating the reception of the downlink signal via the first antenna module based on the transmitted local calibration signal. Inserting a zero-value cyclic prefix between the first positioning symbol and the second positioning symbol may provide a time, in which a local in-situ calibration of the reception of the downlink signal can be performed without interrupting the reception of (payload content) of the downlink signal. The local calibration signal may be used to reduce a phase and amplitude drift caused by temperature changes and vibrations of the mobile transceiver, e.g., of a transportation vehicle comprising or being the mobile transceiver.

For example, the second positioning symbol may be based on a further plurality of samples in the time domain to be transmitted by the base station transceiver. The further plurality of samples may comprise a further sequence of zero-value samples located at an end of the further plurality of samples, so that the cyclic prefix associated with the second positioning symbol is a zero-value cyclic prefix.

Additionally or alternatively, the further plurality of samples may comprise the one or more sequences of zero-value samples and the one or more non-zero value samples following the one or more sequences of zero-value samples. The information related to the location of the mobile transceiver may be further based on the one or more non-zero-value samples received within the line of sight component of the second positioning symbol. The further sequence of zero-value samples may be embedded within the second positioning symbol so the cyclic prefix is a zero-value cyclic prefix. Furthermore, the second positioning symbol may be implemented similar to the first positioning symbol, e.g., comprise the one or more sequences of zero-value samples and the one or more non-zero samples following the one or more sequences of zero-value samples, so the second positioning symbol may also be used in the determination of the information related to the location of the mobile transceiver.

In some exemplary embodiments, the method further comprises determining a transmission power for the local calibration signal such, that the transmission power for the local calibration signal is at least 15 dB and at most 20 dB above a receiver noise power corresponding to a minimal deployed bandwidth of a downlink system of the base station transceiver within a frequency band of the local calibration signal. This may enable a reliable reception of the local calibration signal at the first antenna module, without interfering with signals received by other mobile transceivers.

The local calibration signal may be transmitted and received during the duration of the zero-value cyclic prefix within a frequency band of the downlink data channel, so that a demodulation of other symbols of the downlink signal is unaffected by the local calibration signal. This may enable an in-situ calibration of the reception of the downlink signal without comprising the reception of other signals or of other components of the downlink signal received in other frequency bands.

A duration between samples of the one or more non-zero samples may be based on a delay spread of the downlink data channel between the base station transceiver and the mobile transceiver.

The length of individual sequences of the one or more sequences of zero-value samples may be based on at least one element of the group of a maximal excess delay of the downlink signal, a symbol duration, and a number of samples comprised within the plurality of samples.

By considering the delay spread caused by multi-path propagation the length of the one or more sequences of zero-value samples and the duration between samples of the one or more non-zero samples may be chosen such that a reception of a current non-zero sample of the one or more non-zero samples does not collide with echoes of a previous non-zero sample of the one or more non-zero samples.

In at least some exemplary embodiments, the one or more positioning symbols are integrated within the downlink signal as a positioning slice. The downlink signal may be an orthogonal frequency division multiplexing-based downlink signal. The downlink data channel may be a Physical Downlink Shared Channel, PDSCH of the mobile communication system. The first antenna module may be a Uniform Circular Array (UCA) antenna module. The proposed method may be particularly suitable in OFDM-based signals transmitted via a PDSCH and received via an UCA antenna module.

For example, the mobile transceiver may be a mobile transceiver of a transportation vehicle. The determining of the location of the mobile transceiver may be based on a first height above ground of the mobile transceiver and based on a second height above ground of the base station transceiver. As the height of the base station transceiver and the transportation vehicle are known, a precise calculation of the location of the mobile transceiver may be enabled.

In some exemplary embodiments, a time synchronization between the mobile transceiver and the base station transceiver may have an accuracy of at most 0.5 µs. For example, the time synchronization may be based on a satellite-based time synchronization approach. The method for determining the information related to the location of the mobile transceiver may be used even with a coarse-grained time synchronization between the base station transceiver and the mobile transceiver.

Disclosed embodiments further provide a method for a base station transceiver for a mobile communication system. The method comprises generating one or more positioning symbols for a downlink signal. The one or more positioning symbols comprise a first positioning symbol. At least the first positioning symbol is based on a plurality of samples in a time domain. The plurality of samples comprises one or more sequences of zero-value samples and one or more non-zero-value samples following the one or more sequences of zero-value samples. The method further comprises transmitting the downlink signal comprising the one or more positioning symbols to a mobile transceiver via a downlink data channel of the mobile communication system. The positioning symbols comprising the one or more sequences of zero-value samples may enable identifying the line of sight component of at least the first positioning symbol at the mobile transceiver.

In some exemplary embodiments, the one or more positioning symbols comprise a second positioning symbol. The first positioning symbol and the second positioning symbol may be consecutive symbols within the downlink signal. The second positioning symbol may be associated with a zero-value cyclic prefix, wherein the downlink signal comprises the second positioning symbol with the zero-value cyclic prefix. The duration of the zero-value cyclic prefix may be used at the mobile transceiver for a local calibration of a reception of the downlink signal.

In some exemplary embodiments, the method further comprises periodically repeating a transmission of the one or more positioning symbols within the downlink signal, so that the second positioning symbol is repeated at least once every second. This may enable a calibration of the reception of the downlink signal at regular intervals, which may avoid the phase and/or time to drift more than required for a determination of information related to a location of the mobile transceiver. The downlink signal may be an orthogonal frequency division multiplexing-based downlink signal. The one or more positioning symbols may be built within the downlink signal after a orthogonal frequency division multiplexing-based modulation and before a generation of cyclic prefixes for the symbols of the downlink signal. This may enable the inclusion of the one or more positioning symbols without more complex changes in the symbol generation architecture of the base station transceiver.

For example, the second positioning symbol may be based on a further plurality of samples in the time domain. The further plurality of samples may comprise a further sequence of zero-value samples located at an end of the further plurality of samples. The method may further comprise generating the cyclic prefix for the second positioning symbol so that the cyclic prefix associated with the second positioning symbol is a zero-value cyclic prefix. Including the further plurality of samples may lead to the zero-value cycle prefix when the cyclic prefixes for the symbols of the downlink signal are generated.

In at least some exemplary embodiments, the one or more positioning symbols are suitable for being used to determine information related to a location of mobile transceivers without affecting a demodulation of other symbols within the downlink signal. This may enable a precise determination of the information related to the location of a mobile transceiver at the mobile transceiver with only few restrictions in the downlink data transmission capacity of the downlink signal.

Disclosed embodiments further provide a computer program having a program code for performing at least one of the methods, when the computer program is executed on a computer, a processor, or a programmable hardware component.

Disclosed embodiments further provide an apparatus for a mobile transceiver for a mobile communication system. The apparatus comprises an interface for communicating with a transceiver module of the mobile transceiver. The apparatus comprises a control module configured to receive a downlink signal from a base station transceiver of the mobile communication system via a downlink data channel via the transceiver module and the interface. The downlink signal comprises one or more positioning symbols. The one or more positioning symbols comprise a first positioning symbol. At least the first positioning symbol is based on a plurality of samples in a time domain to be transmitted by the base station transceiver. The plurality of samples comprises one or more sequences of zero-value samples and one or more non-zero-value samples following the one or more sequences of zero-value samples. The control module is configured to identify a line of sight component of at least the first positioning symbol of the downlink signal based on the one or more sequences of zero-value samples. The control module may be configured to operate at a sampling frequency that is high enough to distinguish the line of sight component of a non-zero-value sample from a fastest echo component of the non-zero-value sample by at least one sample. The control module is configured to determine information related to a location of the mobile transceiver based on the one or more non-zero-value samples received within the line of sight component of at least the first positioning symbol. The positioning symbols comprising the one or more sequences of zero-value samples may enable identifying the line of sight component of at least the first positioning symbol. Identifying the line of sight component may enable an improved determination of the information related to the location of the mobile transceiver, which may enable a more accurate determination of the information related to the location with a higher accuracy compared to the version when line of sight-samples of the downlink signal overlap with multipath samples on the receiver side.

Disclosed embodiments further provide an apparatus for a base station transceiver for a mobile communication system. The apparatus comprises an interface for communicating with a transceiver module of the mobile transceiver. The apparatus comprises a control module configured to generate one or more positioning symbols for a downlink signal. The one or more positioning symbols comprise a first positioning symbol. At least the first positioning symbol is based on a plurality of samples in a time domain. The plurality of samples comprises one or more sequences of zero-value samples and one or more non-zero-value samples following the one or more sequences of zero-value samples. The control module is configured to transmit the downlink signal comprising the one or more positioning symbols to a mobile transceiver via a downlink data channel of the mobile communication system via the interface and the transceiver module. The positioning symbols comprising the one or more sequences of zero-value samples may enable identifying the line of sight component of at least the first positioning symbol at the mobile transceiver.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular exemplary embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1B:
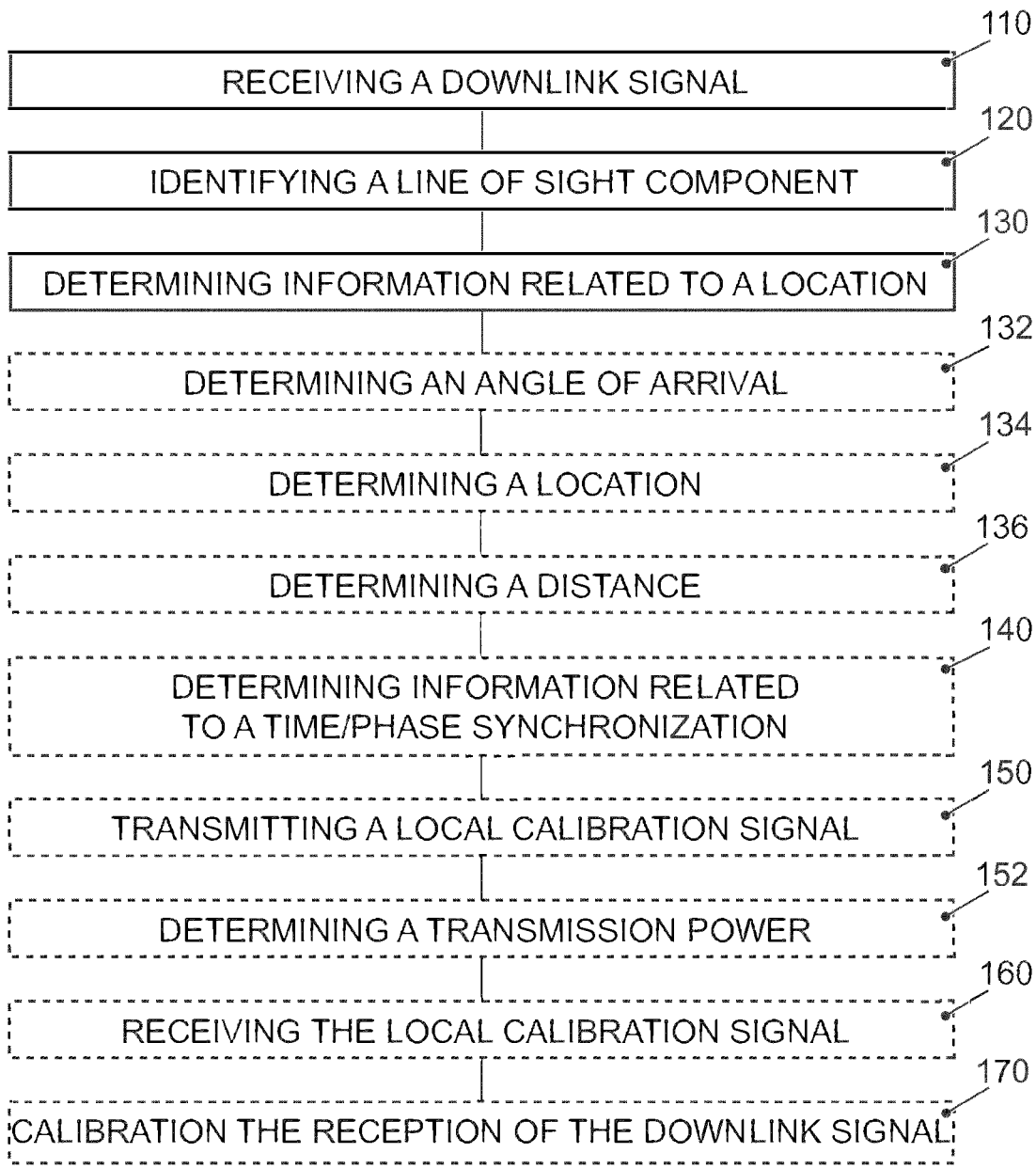
FIG. 1b shows another flow chart of exemplary embodiment of a method for a mobile transceiver.

FIGS. 1a and 1b show flow charts of exemplary embodiments of a method for a mobile transceiver 100 of/for a mobile communication system 300. The method comprises receiving 110 a downlink signal from a base station transceiver 200 of the mobile communication system 300 via a downlink data channel. The downlink signal comprises one or more positioning symbols. The one or more positioning symbols comprise a first positioning symbol. At least the first positioning symbol is based on a plurality of samples in a time domain to be transmitted by the base station transceiver 200. The plurality of samples comprises one or more sequences of zero-value samples and one or more non-zero-value samples following the one or more sequences of zero-value samples. The method comprises identifying 120 a line of sight component of at least the first positioning symbol of the downlink signal based on the one or more sequences of zero-value samples. The method comprises determining 130 information related to a location of the mobile transceiver 100 based on the one or more non-zero-value samples received within the line of sight component of (at least) the first positioning symbol.

Figure 1C:
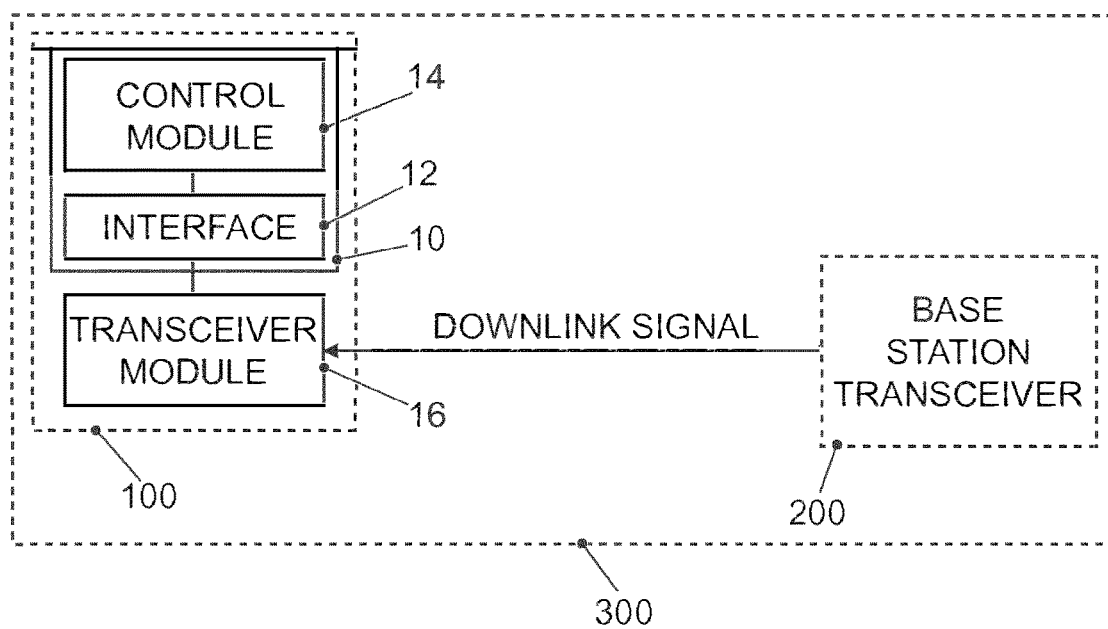
FIG. 1c shows a block diagram of an exemplary embodiment of an apparatus for a mobile transceiver.

FIG. 1c shows a block diagram of an exemplary embodiment of an (corresponding) apparatus 10 for a mobile transceiver 100 of/for a mobile communication system 300. The apparatus 10 comprises an interface 12 for communicating with a transceiver module 16 of the mobile transceiver 100. The apparatus 10 comprises a control module 14 configured to receive a downlink signal from a base station transceiver 200 of the mobile communication system 300 via a downlink data channel via the transceiver module 16 and the interface 12. The downlink signal comprises one or more positioning symbols. The one or more positioning symbols comprise a first positioning symbol. At least the first positioning symbol is based on a plurality of samples in a time domain to be transmitted by the base station transceiver 200. The plurality of samples comprises one or more sequences of zero-value samples and one or more non-zero-value samples following the one or more sequences of zero-value samples. The control module 14 is configured to identify a line of sight component of at least the first positioning symbol of the downlink signal based on the one or more sequences of zero-value samples. The control module 14 is configured to determine information related to a location of the mobile transceiver 100 based on the one or more non-zero-value samples received within the line of sight component of (at least) the first positioning symbol. The control module 14 is coupled to the interface 12. The interface 12 is further coupled to the transceiver module 16. The control module 14 may be further configured to perform additional method operations of the method introduced in connection with FIGS. 1*a* and 1*b*. FIG. 1*c* further shows a mobile transceiver 200 comprising the apparatus 10. FIG. 1*c* further shows the mobile communication system 300 comprising the base station transceiver 200 and the base station transceiver 100.

The following description relates to both the method of FIGS. 1*a* and 1*b* and the apparatus 10 of FIG. 1*c*.

At least some exemplary embodiments may relate to a determination of a location/position of a mobile transceiver 100. For example, the mobile transceiver may be a mobile transceiver of a transportation vehicle that is travelling in a coordinated driving configuration. In many cases, coordinated driving, such as, e.g., platooning, may require a highly precise location determination of the transportation vehicles involved. Such a highly precise determination might not be feasible based on satellite navigation based systems, particularly not in dense urban areas, in which tall buildings may deteriorate signal reception of the satellite navigation signals.

Disclosed embodiments may thus provide a highly precise location determination that is based on signals between the base station transceiver 200 and the mobile transceiver 100. To enable such a location determination, the base station transceiver 200 may be located close to a road that the transportation vehicles comprising the mobile transceivers are using, e.g., at intersections of the road. As the course of roads is often straight, a base station transceiver located at an intersection may have a line of sight to many transportation vehicles traveling on the road. For example, the mobile transceiver may be a vehicle, or the mobile transceiver may be a mobile transceiver of or for a transportation vehicle. The mobile transceiver may be a wireless modem of a transportation vehicle.

The method comprises receiving 110 the downlink signal from the base station transceiver 100 via a downlink data channel. In at least some exemplary embodiments, the downlink signal may be a downlink signal for transmitting downlink payload data from the base station transceiver 200 to the mobile transceiver 100. The downlink data channel may be a shared data channel. For example, if the mobile communication system 300 is a 3GPP-based mobile communication system, the downlink signal may be a downlink data signal received via a Physical Downlink Shared Channel (PDSCH) of the mobile communication system 300. The downlink data channel may be a PDSCH of the mobile communication system 300. The one or more positioning symbols may be integrated within the downlink signal as a positioning slice. The positioning slice may be integrated in the downlink signal. In at least some exemplary embodiments, the downlink signal is an orthogonal frequency division multiplexing-based (OFDM-based) downlink signal. For example, the downlink signal may be an OFDM signal, e.g., a CP-OFDM (Cyclic Prefix OFDM) signal.

The downlink signal comprises one or more positioning symbols. For example, the downlink signal may be received/transmitted using a plurality of slots of the downlink data channel. The downlink data channel may comprise the plurality of slots. Within each slot of the plurality of slots, a plurality of symbols may be received/transmitted. For example, within at least some of the slots of the plurality of slots the one or more positioning symbols may be transmitted. The plurality of symbols may comprise the one or more positioning symbols. For example, the one or more positioning symbols may be transmitted in the same (single) slot of the plurality of slots. The one or more positioning symbols may be repeated, e.g., in each slot of the plurality of slots or in a subset of slots of the plurality of slots. For example, the one or more positioning symbols may be OFDM symbols, e.g., to be transmitted within slots of a 3GPP-based mobile communication system. The one or more positioning symbols may be arranged within a slot (e.g., within the same slot) of a sub-frame of the downlink data channel. The one or more positioning symbols may be suitable for being used to determine information related to a location of mobile transceivers without affecting a demodulation of other symbols within the downlink signal.

The one or more positioning symbols comprise the first positioning symbol. In some exemplary embodiments, the one or more positioning symbols may further comprise a second positioning symbol. For example, the one or more positioning symbols may comprise more than two positioning symbols. In at least some exemplary embodiments, the one or more positioning symbols may be arranged (directly) consecutively within the downlink signal.

At least the first positioning symbol is based on a plurality of samples in a time domain to be transmitted by the base station transceiver 200. For example, an LTE OFDM symbol may be based on 2048 samples plus 160 (for the first)/144 (for subsequent) samples for the cyclic prefix of the LTE OFDM symbol at a 30.72 MHz sampling rate. The plurality of samples may exclude the samples of the cyclic prefix. For example, also the second positioning symbol may be based on the plurality of samples in the time domain. In at least some exemplary embodiments, the first positioning symbol and the second positioning symbol may be identical, e.g., based on the same plurality of samples. The plurality of samples comprises one or more sequences of zero-value samples and one or more non-zero-value samples following the one or more sequences of zero-value samples. For example, each sequence of zero-value samples of the one or more sequences of zero-value samples may be followed by a non-zero value sample of the one or more non-zero-value samples. For example, a zero-value sample may be a sample, at which a transceiver module of the base station transceiver is muted (at a frequency band used for the one or more positioning symbols). A non-zero-value sample may be sample, at which something is transmitted by the base station transceiver (at the frequency band used for the one or more positioning symbols). A zero-value sample may be a sample representing a logic zero value, and a non-zero sample may be sample representing a logic non-zero (e.g., one) value. For example, the zero-value sample may be based on a "low" value for the sample, and the non-zero-value sample may be based on a "high" value for the sample.

A duration between samples of the one or more non-zero samples may be based on a delay spread of the downlink data channel between the base station transceiver 200 and the mobile transceiver 100. For example, the duration between samples of the one or more non-zero samples may be such, that a received power of non-line of sight components (e.g., reflected components) of a previous non-zero-value sample of the one or more non-zero-value samples is lower than 10% (or lower than 5%, lower than 2%, lower than 1%) than a received power of a line of sight component of non-zero value samples of the one or more non-zero-value samples. In at least some exemplary embodiments, the duration between samples of the one or more non-zero samples may be such, that, at the mobile transceiver, within the received downlink signal, the line of sight component of at least the first positioning symbol is seen in isolation (e.g., without non line of sight components of previous non-zero samples being seen at the same time). The length of individual sequences of the one or more sequences of zero-value samples may be based on at least one element of the group of a maximal excess delay of the downlink signal, a symbol duration, and a number of samples comprised within the plurality of samples. For example, the length of individual sequences of the one or more sequences of zero-value samples may be chosen based on the delay spread of the downlink data channel between the base station transceiver 200 and the mobile transceiver 100. The length of individual sequences of the one or more sequences of zero-value samples may be based or correspond to the duration between samples of the one or more non-zero samples. In at least some exemplary embodiments, at least a portion of the first (and second) positioning symbol may alternate between sequences of the one or more sequences of zero-value samples and non-zero value samples of the one or more non-zero-value samples. In some examples, the one or more sequences of zero-value samples may be a plurality of sequences of zero-value samples, and the one or more non-zero value samples following the one or more sequences of zero-value samples may be a plurality of non-zero-value samples following the plurality of sequences of zero-value samples.

In at least some exemplary embodiments, the one or more positioning symbols form a positioning slice. The positioning slice may be suitable for a physical layer of the mobile communication system 300. For example, the positioning slice may be transmitted on the physical downlink shared channel of the mobile communication system. The positioning slice is, as it comprises the one or more positioning symbols, based on the plurality of samples in a time domain to be transmitted by the base station transceiver 200 comprising the one or more sequences of zero-value samples and the one or more non-zero-value samples following the one or more sequences of zero-value samples. The received downlink signal comprising the positioning slice may be suitable for simultaneous communication and highly precise positioning.

The method comprises identifying 120 the line of sight component of at least the first positioning symbol of the downlink signal based on the one or more sequences of zero-value samples. The identification 120 of the line of sight component may be based on processing the one or more non-zero-value samples for line of sight detection. For example, the identifying 120 of the line of sight component may comprise determining, whether a signal component of the downlink signal is a line of sight component of a non-zero sample of the first (and/or the second) positioning symbol, e.g., based on an amplitude of the signal component and/or based on an absence of other signal components caused by multi-path propagation of the downlink signal. For example, due to the one or more sequences of zero-value samples, a signal component of the downlink signal may be distinguishable as line of sight signal component of a non-zero sample of the first (and/or the second) positioning symbol. For example, a signal component of the downlink signal may be determined to be a line of sight component of a non-zero sample of the first (and/or the second) positioning symbol, if due to a sequence of zero-value samples of the one or more sequences of zero-value samples, the signal component of the non-zero sample arrives at the mobile transceiver without overlap from multi-path components of previous non-zero samples. In at least some exemplary embodiments, identifying 120 the line of sight component may correspond to sampling the line of sight component of the non-zero sample of the first (and/or the second) positioning symbol in isolation, e.g., before multi-path components of the non-zero sample arrive at the mobile transceiver. For example, a sample rate at the mobile transceiver (e.g., at the interface 12, the control module 14 and/or the transceiver module 16) may be high enough to enable the identification of the line of sight component.

The method further comprises determining 130 the information related to a location of the mobile transceiver 100 based on the one or more non-zero-value samples received within the line of sight component of the first positioning symbol.

In at least some exemplary embodiments, the determining 130 of the information related to the location of the mobile transceiver 100 comprises, as shown in FIG. 1b, determining 132 an angle of arrival of the line of sight component of at least the first positioning symbol (e.g., of the first positioning symbol and the second positioning symbol) of the downlink signal based on the one or more non-zero-value samples and determining 134 the location of the mobile transceiver 100 based on the angle of arrival of the line of sight component. For example, the determination 312 of the angle of arrival may comprise determining an azimuth component of the angle of arrival and an elevation component of the angle of arrival. The angle of arrival may be a three-dimensional angle of arrival. In at least some exemplary embodiments, the angle of arrival may be determine based on the line of sight component of the non-zero sample of the first (and/or the second) positioning symbol sampled in isolation. In some exemplary embodiments, the angle of arrival may be determined based on (all of) the one or more non-zero-value samples. Alternatively, a single non-zero-value-sample of the one or more non-zero-value samples may be used to determine the angle of arrival. In at least some exemplary embodiments, only the line of sight component of at least the first positioning symbol (e.g., of the first positioning symbol and the second positioning symbol) may be used to determine the angle of arrival. For example, multi-path components of the line of sight component of at least the first positioning symbol (e.g., of the first positioning symbol and the second positioning symbol) may be discarded in the determination of the angle of arrival. In at least some exemplary embodiments, the determination 132 of the angle of arrival is based on an emitter location determination algorithm, e.g., based on the MUSIC (Multiple Signal Classification) algorithm.

For example, the mobile transceiver 100 may be a mobile transceiver of a transportation vehicle. The determining 130 of the location of the mobile transceiver may be based on a first height above ground of the mobile transceiver 100 and based on a second height above ground of the base station transceiver 200. For example, the determination of the location of the mobile transceiver may be based on the angle of arrival of the line of sight component of the downlink signal, based on the first height above ground of the mobile transceiver and based on the second height above ground of the base station transceiver. For example, the location of the mobile transceiver may be determined relative to the base station transceiver. Alternatively or additionally, the location of the mobile transceiver may be determined within an absolute (three-dimensional) coordinate system. The information related to the location of the mobile transceiver may be or may comprise the location of the mobile transceiver (e.g., in relative or absolute coordinates).

In some exemplary embodiments, the time synchronization between the mobile transceiver 100 and the base station transceiver 200 has an accuracy of at most 0.5 μs. The time synchronization may be based on a satellite-based time synchronization approach. If the determination of the information related to the location of the mobile transceiver is based on the determination of the angle of arrival of the line of sight component, a (coarse grained) time synchronization between the mobile transceiver 100 and the base station transceiver 200 may be used. In at least some exemplary embodiments, the determination of the angle of arrival may be independent of the time synchronization between the mobile transceiver 100 and the base station transceiver 200.

Alternatively or additionally, the information related to the location of the mobile transceiver may be determined based on a distance between the mobile transceiver and the base station transceiver. As shown in FIG. 1b, the method may further comprise determining 140 information related to a time and/or phase synchronization between the mobile transceiver 100 and the base station transceiver 200 based on the one or more non-zero-value samples received within the line of sight component of at least the first positioning symbol (e.g., the first and the second positioning symbol). For example, the determining 140 of the information related to the time and/or phase synchronization between the mobile transceiver 100 and the base station transceiver 200 may comprise refining a satellite-based time synchronization between the mobile transceiver and the base station transceiver based on the one or more non-zero-value samples received within the line of sight component of at least the first positioning symbol.

The determining 130 of the information related to the location of the mobile transceiver 100 may comprise determining 136 a distance between the mobile transceiver 100 and the base station transceiver 200 based on the information related to the time/and or phase synchronization. For example, the determining 136 of the distance between the mobile transceiver 100 and the base station transceiver 200 may be based on a propagation time of the line of sight component of at least the first positioning symbol and based on the information related to the time/and or phase synchronization.

In some exemplary embodiments, the one or more positioning symbols comprise a second positioning symbol. The second positioning symbol may be implemented similar to the first positioning symbol. The first positioning symbol and the second positioning symbol may be consecutive symbols within the downlink signal. The second positioning symbol may be associated with a zero-value cyclic prefix. For example, a cyclic prefix of the second positioning symbol may be a zero-value cyclic prefix. For example, the downlink signal, as transmitted by the base station transceiver, may be muted during the transmission of the cyclic prefix of the second positioning symbol (e.g., at a frequency band used for a transmission of the second positioning symbol). In at least some exemplary embodiments, the first positioning symbol may also be associated with a zero-value cyclic prefix.

The downlink signal may be received via a first antenna module of the mobile transceiver 100. For example, the mobile transceiver 100 may comprise the first antenna module and a second antenna module. In some exemplary embodiments, the apparatus 10 may comprise one or more elements of the group of the transceiver module 16, the first antenna module and the second antenna module. For example, the first antenna module may be a Uniform Circular Array antenna module that may be connected to a coherent multi-channel receiver module. The second antenna module may be a rod antenna. In at least some exemplary embodiments, the second antenna module may be arranged in a center of a circle formed by antennas of the first antenna module. For example, an (e.g., the only) antenna of the second antenna module may be arranged (substantially) equidistant to each antenna of the first antenna module. The first antenna module and the second antenna module may be coupled or connected to the transceiver module 16.

The method may, as further shown in FIG. 1b, further comprise transmitting 150 a local calibration signal via the second antenna module (e.g., and via the interface and the transceiver module) of the mobile transceiver 100 within a duration of the zero-value cyclic prefix of the second positioning symbol (e.g., and of the first positioning symbol). The method may further comprise receiving 160 the local calibration signal via the first antenna module (e.g., and via the interface and the transceiver module). The local calibration signal may be transmitted and received at a (e.g., the same) frequency band used for the downlink signal. The local calibration signal may be transmitted 150 and received 160 during the duration of the zero-value cyclic prefix within a frequency band of the downlink data channel, so that a demodulation of other symbols of the downlink signal is unaffected by the local calibration signal. The method may further comprise calibrating 170 the reception of the downlink signal via the first antenna module based on the transmitted local calibration signal. In at least some exemplary embodiments, the calibration 170 of the reception of the downlink signal may correspond to a calibration of a reception of signals via the first antenna module. The calibration 170 of the reception of the downlink signal may be based on a matching filter algorithm. The calibration 170 of the reception of the downlink signal may comprise using the (known) local calibration signal to estimate drift coefficients of the first antenna module. The calibration 170 of the reception of the downlink signal may further comprise compensating the drift of the first antenna module based on the drift coefficients. In at least some exemplary embodiments, the calibration 170 is an in-situ (or "online") calibration.

In at least some exemplary embodiments, the second positioning symbol is based on a further plurality of samples in the time domain to be transmitted by the base station transceiver 200. In some exemplary embodiments, the further plurality of samples may correspond to the plurality of samples. Alternatively, the further plurality of samples may differ from the plurality of samples. The further plurality of samples may comprise a further sequence of zero-value samples located at an end of the further plurality of samples, so that the cyclic prefix associated with the second positioning symbol is a zero-value cyclic prefix. The further plurality of samples may comprise the one or more sequences of zero-value samples and the one or more non-zero value samples following the one or more sequences of zero-value samples (e.g., similar to the first positioning symbol). The information related to the location of the mobile transceiver 100 may be further based on the one or more non-zero-value samples received within the line of sight component of the second positioning symbol.

In some exemplary embodiments, as shown in FIG. 1b, the method further comprises determining 152 a transmission power for the local calibration signal. The transmission power may be determined such, that the transmission power for the local calibration signal is at least 15 dB and at most 20 dB above a receiver noise power corresponding to a minimal deployed bandwidth of a downlink system of the base station transceiver 200 within a frequency band of the local calibration signal. For example, the transmission power may be determined such, that the transmission power for the local calibration signal is (substantially) 20 dB above a receiver noise power corresponding to a minimal deployed bandwidth of a downlink system of the base station transceiver 200 within a frequency band of the local calibration signal.

In general, the mobile communication system 300 may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver, e.g., the base station transceiver 200, can be operable to communicate with one or more active mobile transceivers and a base station transceiver can be located in or adjacent to a coverage area of another base station transceiver, e.g., a macro cell base station transceiver or small cell base station transceiver. Hence, exemplary embodiments may provide a mobile communication system comprising one or more mobile transceivers and one or more base station transceivers, wherein the base station transceivers may establish macro cells or small cells, as e.g., pico-, metro-, or femto cells. A mobile transceiver, e.g., the mobile transceiver 100, may correspond to a smartphone, a cell phone, user equipment, radio equipment, a mobile, a mobile station, a laptop, a notebook, a personal computer, a Personal Digital Assistant (PDA), a Universal Serial Bus (USB)-stick, a car, a mobile relay transceiver for D2D communication, etc. A mobile transceiver may also be referred to as User Equipment (UE) or mobile in line with the 3GPP terminology.

A base station transceiver, e.g., the base station transceiver 200, can be located in the fixed or stationary part of the network or system. A base station transceiver may correspond to a remote radio head, a transmission point, an access point, radio equipment, a macro cell, a small cell, a micro cell, a femto cell, a metro cell etc. A base station transceiver may correspond to a base station understood as a logical concept of a node/entity terminating a radio bearer or connectivity over the air interface between a terminal/mobile transceiver and a radio access network. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point, a relay transceiver etc., which may be further subdivided in a remote unit and a central unit.

A mobile transceiver, e.g., the mobile transceiver 100, can be associated, camped on, or registered with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

The interface 12 (or an interface 22 as introduced in connection with FIG. 2b) may correspond to one or more inputs and/or outputs for receiving and/or transmitting information, which may be in digital (bit) values according to a specified code, within a module, between modules or between modules of different entities.

In exemplary embodiments, the control module 14 (or a control module 14 as introduced in connection with FIG. 2b) may be implemented using one or more processing units, one or more processing devices, any method or mechanism for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

Figure 2A:
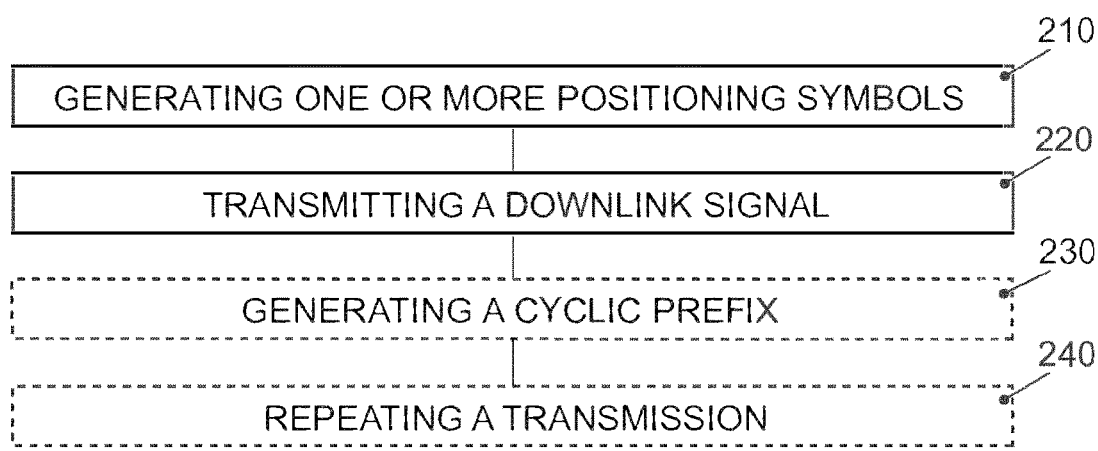
FIG. 2a shows a flow chart of an exemplary embodiment of a method for a base station transceiver.
Figure 2B:
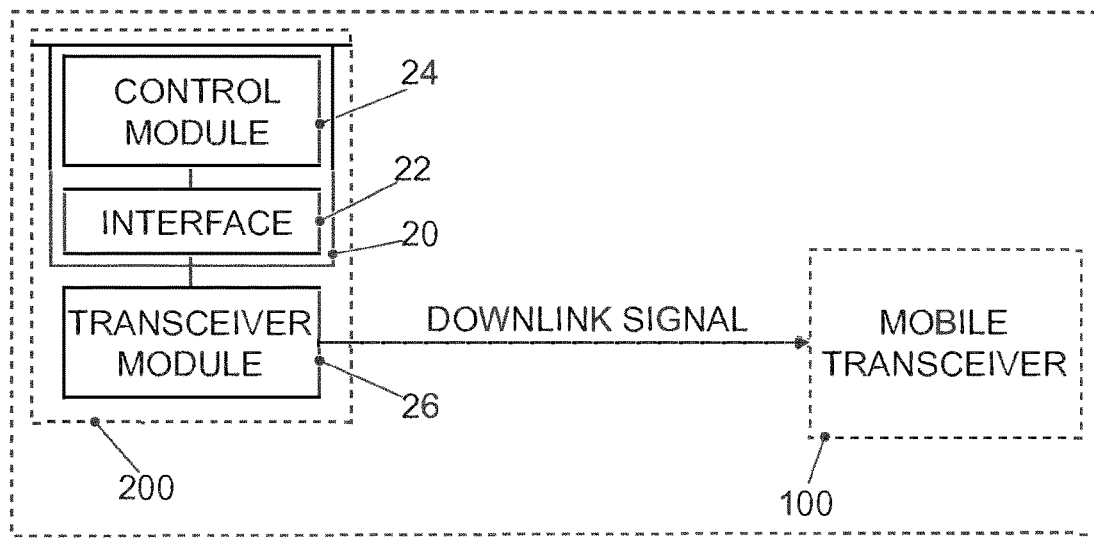
FIG. 2b shows a block diagram of an exemplary embodiment of an apparatus for a base station transceiver.

The transceiver module 16 (and or a transceiver module 26 as introduced in connection with FIG. 2b), may be implemented as any method or mechanism for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

More details and properties of the method and/or apparatus 10 are mentioned in connection with the proposed concept or one or more examples described above or below (e.g., FIGS. 2a to 8). The method and/or apparatus 10 may comprise one or more additional optional features corresponding to one or more facets of the proposed concept or one or more examples described above or below.

FIG. 2a shows a flow chart of an exemplary embodiment of a method for a base station transceiver 200 of a mobile communication system 300. The method comprises generating 210 one or more positioning symbols for a downlink signal. The one or more positioning symbols comprise a first positioning symbol. At least the first positioning symbol (e.g., the first positioning symbol and a second positioning symbol) is based on a plurality of samples in a time domain. The plurality of samples comprises one or more sequences of zero-value samples and one or more non-zero-value samples following the one or more sequences of zero-value samples. The method comprises transmitting 220 the downlink signal comprising the one or more positioning symbols to a mobile transceiver 100 via a downlink data channel of the mobile communication system 300.

FIG. 2b shows a block diagram of an exemplary embodiment of a (corresponding) apparatus 20 for a base station transceiver of (or for) a mobile communication system 300. The apparatus 20 comprises an interface 22 for communicating with a transceiver module 26 of the mobile transceiver 100. The apparatus 20 comprises a control module 24 configured to generate one or more positioning symbols for a downlink signal. The one or more positioning symbols comprise a first positioning symbol. At least the first positioning symbol (e.g., the first positioning symbol and the second positioning symbol) is based on a plurality of samples in a time domain. The plurality of samples comprises one or more sequences of zero-value samples and one or more non-zero-value samples following the one or more sequences of zero-value samples. The control module 24 is configured to transmit the downlink signal comprising the one or more positioning symbols to a mobile transceiver 100 via a downlink data channel of the mobile communication system 300 via the interface 22 and the transceiver module 26. The control module 24 is coupled to the interface 22. The interface 22 is coupled to the transceiver module 26. The control module 24 may be configured to perform further method operations of the method introduced in connection with FIG. 2b. FIG. 2b further shows the base station transceiver 200 comprising the apparatus 20. FIG. 2b further shows the mobile communication system 300 comprising the base station transceiver 200 and the base station transceiver 100.

The following description relates to both the method of FIG. 2a and the apparatus 20 of FIG. 2b.

The method comprises generating 210 the one or more positioning symbols for the downlink signal. For example, the generating 210 of the one or more positioning symbols may comprise determining a duration between samples of the one or more non-zero-value samples. The generating 210 of the one or more positioning may comprise determining a length of sequences of zero-value samples of the one or more sequences of zero value samples, e.g., based on the duration between samples of the one or more non-zero-value samples. A duration between samples of the one or more non-zero samples may be based on a delay spread of the downlink data channel between the base station transceiver 200 and the mobile transceiver 100. For example, the duration between samples of the one or more non-zero samples may be such, that a received power of non-line of sight components (e.g., reflected components) of a previous non-zero-value sample of the one or more non-zero-value samples is lower than 10% (or lower than 5%, lower than 2%, lower than 1%) than a received power of a line of sight component of non-zero value samples of the one or more non-zero-value samples. In at least some exemplary embodiments, the duration between samples of the one or more non-zero samples may be such, that, at the mobile transceiver, within the received downlink signal, the line of sight component of at least the first positioning symbol is seen in isolation (e.g., without non line of sight components of previous non-zero samples being seen at the same time). The length of individual sequences of the one or more sequences of zero-value samples may be based on at least one element of the group of a maximal excess delay of the downlink signal, a symbol duration, and a number of samples comprised within the plurality of samples. For example, the length of individual sequences of the one or more sequences of zero-value samples may be chosen based on the delay spread of the downlink data channel between the base station transceiver 200 and the mobile transceiver 100. The length of individual sequences of the one or more sequences of zero-value samples may be based or correspond to the duration between samples of the one or more non-zero samples. In at least some exemplary embodiments, the generating of the one or more positioning symbols may comprise alternating sequences of the one or more sequences of zero-value samples and non-zero-value samples of the one or more non-zero-value samples. In some exemplary embodiments, the duration between samples of the one or more non-zero samples and/or the length of individual sequences of the one or more sequences of zero-value samples may be based on a distance between the base station transceiver and the mobile transceiver, at which an increased accuracy of the determination of information related to a location of the mobile transceiver is desired.

In at least some exemplary embodiments, the one or more positioning symbols comprise a second positioning symbol. The first positioning symbol and the second positioning symbol may be consecutive symbols within the downlink signal. The second positioning symbol may be associated with a zero-value cyclic prefix, wherein the downlink signal comprises the second positioning symbol with the zero-value cyclic prefix. For example, the second positioning symbol may be based on a further plurality of samples in the time domain. The further plurality of samples may comprise a further sequence of zero-value samples located at an end of the further plurality of samples. The method may further comprise generating 230 the cyclic prefix for the second positioning symbol so that the cyclic prefix associated with the second positioning symbol is a zero-value cyclic prefix. In some exemplary embodiments, the generating 210 of the one or more positioning symbols may comprise generating the second positioning symbol such, that the second positioning symbol comprise a further sequence of zero-value samples located at an end of a further plurality of samples forming the second positioning symbol.

In at least some exemplary embodiments the method further comprises periodically repeating 240 a transmission of the one or more positioning symbols within the downlink signal, so that the second positioning symbol is repeated at least once every second (or at least every 500 ms, at least every 200 ms, at least every 100 ms). For example, the one or more positioning symbols may be generated 210 such for a plurality of slots of the downlink data channel, that the one or more positioning symbols comprise (only) the first positioning symbol in a first subset of slots of the plurality of slots, and such that the one or more positioning symbols comprise the first positioning symbol and the second positioning symbol in a second subset of slots of the plurality of slots.

In at least some exemplary embodiments, the downlink signal is an orthogonal frequency division multiplexing-based downlink signal. The one or more positioning symbols may be built within the downlink signal after an orthogonal frequency division multiplexing-based modulation and before a generation of cyclic prefixes for the symbols of the downlink signal. The method may comprise generating the downlink signal. The method may comprise generating symbols for the downlink signal based on orthogonal frequency division multiplexing-based modulation and generating cyclic prefixes for the symbols of the downlink signal. The method may comprise providing (e.g., inserting) the one or more positioning symbols into the downlink signal between the generation of the symbols and before the generation of the cyclic prefixes.

More details and properties of the base station method and/or the base station apparatus 20 are mentioned in connection with the proposed concept or one or more examples described above or below (e.g., FIG. 1*a* to 1*c*, 3 to 8). The base station method and/or the base station apparatus 20 may comprise one or more additional optional features corresponding to one or more facets of the proposed concept or one or more examples described above or below.

At least some exemplary embodiments relate to a Positioning slice for simultaneous communications and accurate mobile positioning Using current mobile radio networks might not be feasible to obtain mobile positioning accuracy, which can be used for safety automotive applications. For example, in truck platooning, automated overtake and collision avoidance at intersections, a mobile positioning accuracy better than 30 cm may be required. The current design of mobile radio communication systems do not allow for obtaining this accuracy.

In some systems, array antennas with coherent receivers might have to be continuously calibrated due phase and amplitude drifts which occurs due to temperature changes in the car. Array antennas are usually used to determine mobile positioning features such as the angle of arrivals (AOA) of RF signals. Especially uniform circular array (UCA) antenna modules are preferred for deployment thanks to their 360° ability. When the receiver channels are drifted to each other, the estimation of AOA may become unreliable.

For mobile positioning, different approaches may be used, such as Trilateration, Angulation, Fingerprinting based positioning, relative positioning to a reference base station with 3D-Angle of Arrival (3D-AOA) and distance estimation, observed time difference of arrival (OTDOA) using integrated pilots in communication frame structures for positioning purposes (positioning reference signal PRS in LTE downlink frame).

The downside of many mobile positioning schemes is that they cannot overcome the problem of multipath propagation in urban area due to the small signal bandwidth. Therefore, it might not be feasible with such communication systems to achieve highly precise mobile positioning in urban areas.

For the calibration of UCA antennas, approaches to calibrated multi-channel receiver using fixed known sources with known AOA may be used offline. In some cases, a joint online calibration and AOA detection may be used. Other approaches may use a calibration antenna located at the center of the UCA, which sends phase symmetric calibration signals to receiving antennas in the UCA. The connected multi-channel receiver may then be calibrated using a matching filter based on the known sent calibration signal.

The drawback of these calibration schemes is that either they are offline, which is not practical for cars since the UCA and its corresponding multi-channel receiver are fixed deployed in the car. Or they do not consider the integration of these receiving system with ongoing communication (In-Situ) in the online calibration scheme.

Network condensifaction is an approach which has been proposed as a 5G positioning approach. It may require a highly accurate synchronization between base stations and larger number of base stations in small area. The related hardware costs might be too high to reach highly accurate positioning.

At least some exemplary embodiments relate to a Positioning Slice (e.g., the one or more positioning symbols) for Highly Precise Mobile Positioning.

Figure 3:
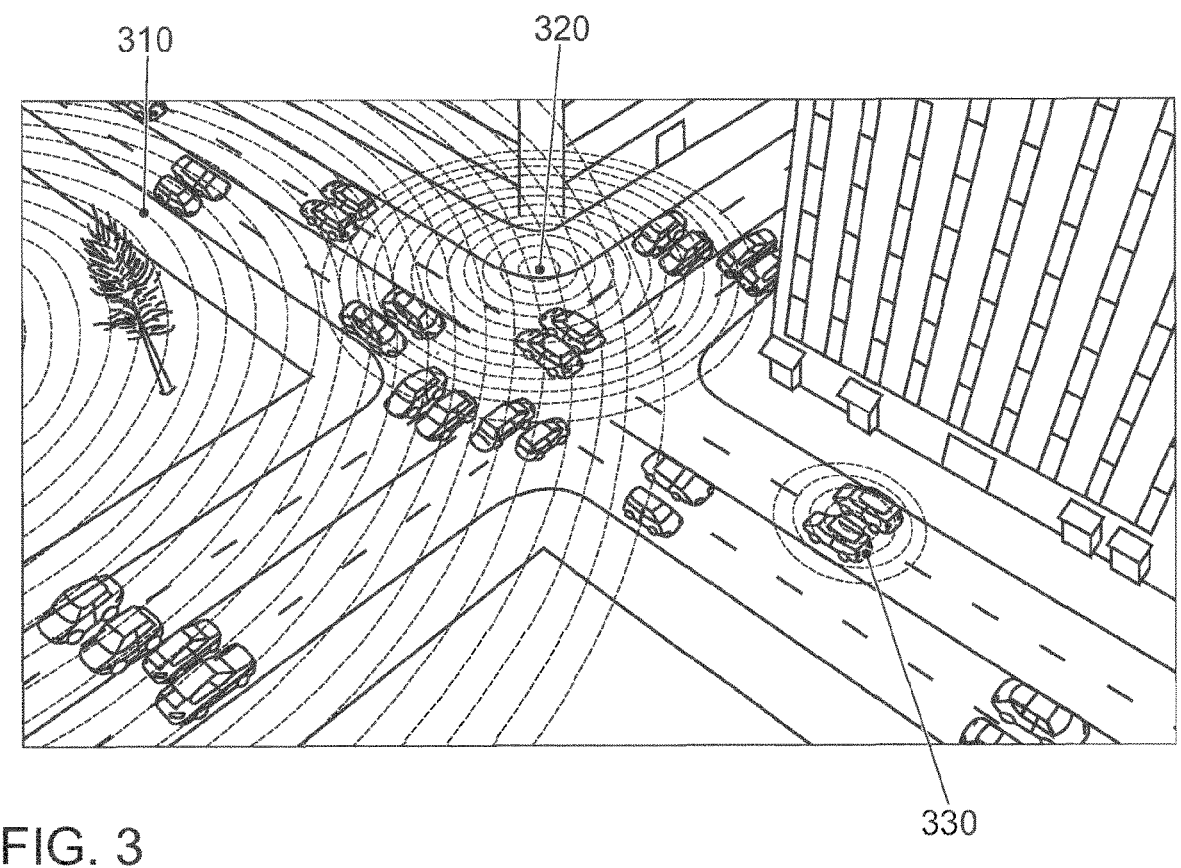
FIG. 3 shows a schematic diagram of a traffic situation at an intersection.

Mobile positioning using mobile radio networks may be a challenge when it comes to highly precise positioning in urban areas. FIG. 3 shows a schematic diagram of an exemplary traffic situation at an intersection. The signals of a first base station 310 (e.g., a macro base station) and a second base station 320 (e.g., a smaller base station located at an intersection) may be received by a transportation vehicle 330.

Different reasons make accurate mobile positioning in urban areas very difficult:
Multipath propagation
Small signal bandwidth Even if the line-of-sight signal is available, it might be not feasible to properly separate the first arriving path from the multipath signals in temporal dimension due to small bandwidth of available mobile radio networks. In LTE (Long Term Evolution) downlink signals, the maximum available bandwidth is 20 MHz, which allows for a temporal resolution of approximately 3.2568e-08s. This value means that the fastest multipath has to fly 10 m longer than the LOS signal to resolve the first arriving path. Hence the distance accuracy from a mobile station to an eNodeB might not be better than 10 m.

Spatial separation of the first arriving signal may be applied in positioning methods using array antennas and array signal processing on coherent multi-channel receivers. Uniform circular array (UCA) antennas may be used due to the 360° coverage and the ability to estimate the angle of arrival (AOA) in the azimuth and elevation plane of received signals. However, the spatial separation is strongly degraded in multipath coherent channels, which is the case in urban areas.

To overcome the signal bandwidth limitations, the distance from a UCA mounted on the rooftop of a transportation vehicle to an eNodeB may be calculated using the elevation AOA θ. For that purpose, the AOA estimation of the first arriving signal may be an estimation with high accuracy in a dense multipath environment. This may be based on adapting the waveform of downlink LTE signals (e.g., the downlink signal) such that even in dense environments, a piece of the received signal on the baseband might comprise only the LOS signal without disturbing the LTE downlink communication. To do this, a positioning slice (e.g., the one or more positioning symbols) in a radio access network (RAN) may be generated on the baseband on PHY on the eNodeB (enhanced Node B).

Figure 4:
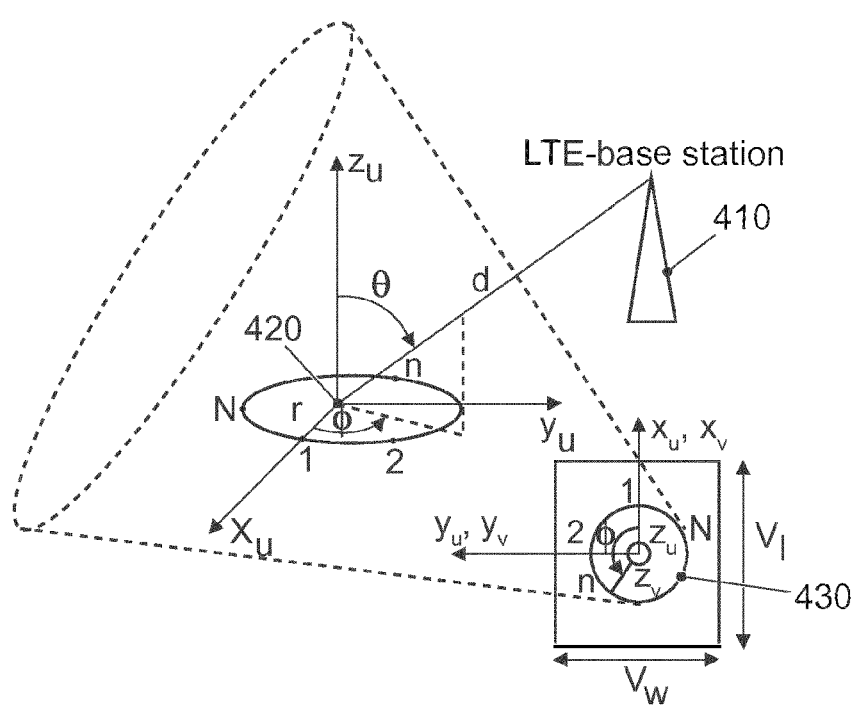
FIG. 4 shows a schematic diagram of a three-dimensional angle-of-arrival-based determination of a location of a mobile transceiver.

FIG. 4 shows a schematic diagram of a three-dimensional angle-of-arrival-based determination of a location of a mobile transceiver. FIG. 410 shows a LTE base station (e.g., the base station transceiver 100) transmitting a line of sight signal to a point 420, at which the angle of arrival is to be determined. The angle of arrival comprises an elevation angle θ between the z-axis of point 420 and the line of sight component and an azimuth angle φ between the x-axis of point 420 and the line of sight component. The resulting angles are translated into the coordinate system of the transportation vehicle 430, where Vl is the length of the transportation vehicle and Vw is the width of the transportation vehicle.

Figure 5:
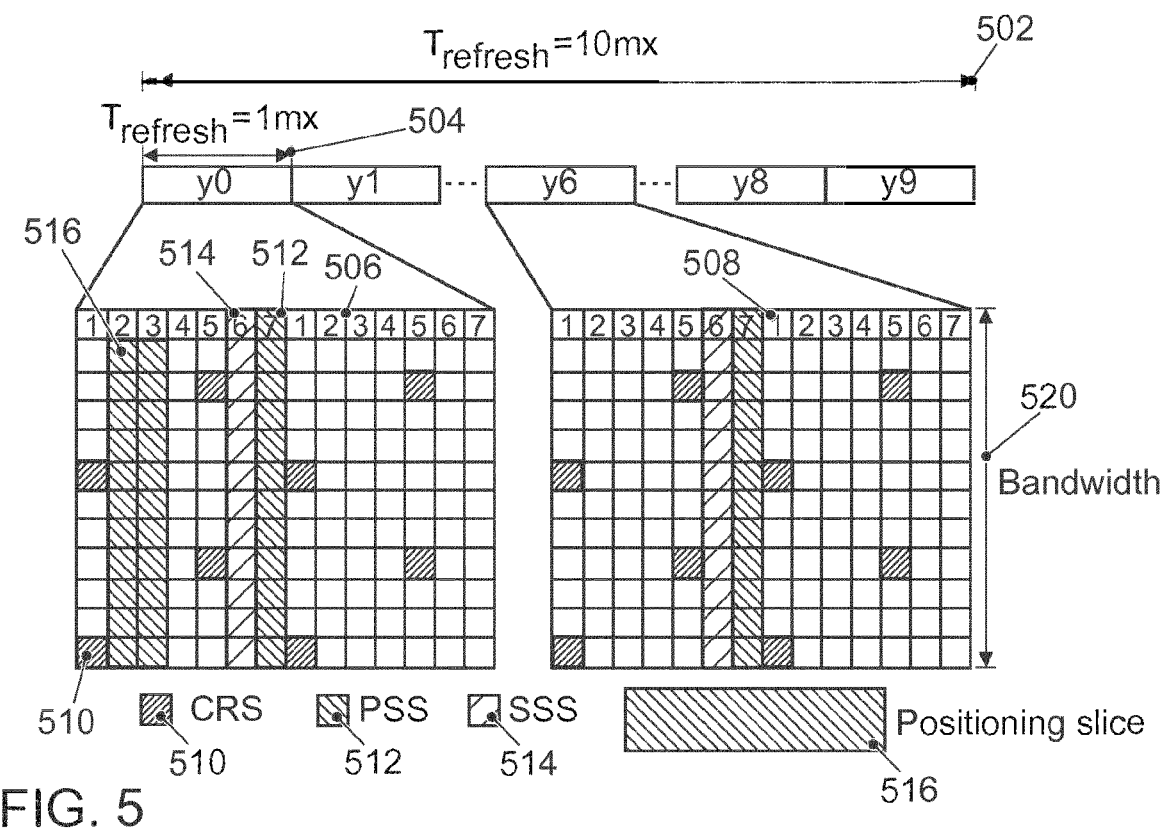
FIG. 5 shows a schematic diagram of slots of an orthogonal frequency division multiplexing-based downlink signal.

The positioning slicing approach in RAN in OFDM based PHY systems comprises dedicating OFDM symbols in the transmission frame, e.g., the one or more positioning symbols, e.g., LTE downlink frame, only for positioning purposes. A positioning slice may be composed of or comprise at least of two consecutive OFDM symbols of the physical shared data channel, e.g., the one or more positioning symbols, where user data are allocated and transmitted. FIG. 5 shows a schematic diagram of slots of an orthogonal frequency division multiplexing-based downlink signal. FIG. 5 502 shows an LTE frame 502 with a length of 10 ms. Frame 502 comprises 10 sub-frames 504 (#0 to #9) with a length of 1 ms each. Each sub-frame comprises two slots with seven symbols each. In FIG. 5, the first sub-frame (#0) 506 and the sixth subframe (#5) 508 are shown. Symbols 2 and 3 of the first slot of the first subframe are used for positioning slices 516 (e.g., the one or more positioning symbols) are arranged. Symbols 6 and 7 of the first slot of the subframes are used for primary 512 (PSS) and secondary 514 (CSS) synchronization signals. Interspersed within the subframes is the cell-specific reference signal 510 (CRS). The one or more positioning symbols may stretch over the entire bandwidth 520 of the resource blocks used for the subframes.

Figure 6:
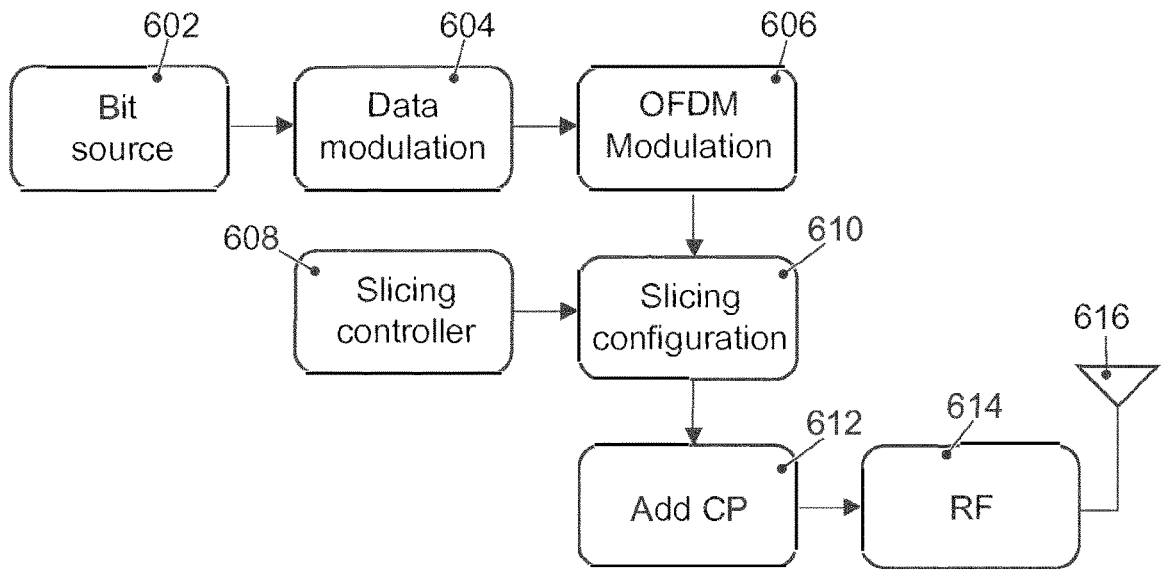
FIG. 6 shows a block diagram of blocks involved in the generation of a downlink signal.

The idea may be to manipulate the slice OFDM symbols in the transmission chain before adding the cyclic prefix. The manipulation comprises setting samples of these symbols to zeros in a systematic way to generate transmission pauses in the transmission process. FIG. 6 shows a block diagram of a blocks involved in the generation of a downlink signal. In FIG. 6, a bit source block 602 provides data bits for data modulation to data modulation block 604. The modulated data is provided to OFDM modulation block 606. The OFDM modulation block 606 provides the OFDM-modulated data as OFDM symbols to slicing configuration block 610. A slicing controller 608 (e.g., the apparatus 20) provides the configuration scheme and the order of the OFDM symbol corresponding to the positioning slice (e.g., the one or more positioning symbols) to the slicing configuration block 610. In block 612, a cyclic prefix is added to the OFDM symbols of OFDM modulation block 606 and to the one or more positioning symbols. A RF (Radio Frequency) block 614 (e.g., the transceiver module 26) provides the symbols and cyclic prefixes to an antenna module 616 for transmission to a mobile transceiver.

The first sample (e.g., of the plurality of samples) might always be non-zero. The number of samples between two non-zero samples in a positioning slice (e.g., a sequence of zero-value samples) may consider the symbol duration, the FFT (Fast Fourier Transformation) length and the maximum excess delay in the urban channel, where the transportation vehicle is located. The slicing controller may comprise the timing information of the OFDM symbols of the positioning slice and generate the number of zeros samples (e.g., the sequence of zero-value samples) between two non-zero samples in the positioning slice. The slicing configuration module may set the zeros in the OFDM symbols.

The last samples (e.g., the further sequence of zero-value samples) of these OFDM symbols may be set to zeros to generate zeros CP (cyclic prefix) zones, where the UCA (Uniform Circular Array) antenna can be online calibrated, which will be explained in more detail in the following. Else, a slice OFDM symbol starts non zero-sample and set $$\left\lfloor \frac{(FFT_{length} \cdot \Delta\tau_{max})}{T_s} \right\rfloor + 1$$

Zero-samples between two consecutive non-zero samples, where $FFT_{length}$ denotes the FFT length, $\Delta\tau_{max}$ the maximum excess delay ad $T_s$ the symbol duration in the OFDM modulation. Based on this approach, it may be avoided that the LOS signal overlaps with multipath signals at the receiver if the ADC sampling rate is sufficiently high to separate the LOS signal from the fastest multipath signal by at least one sample. Hence, it may be feasible to separate large number of the LOS samples from the multipath samples and estimates the AOA based only on LOS samples.

Figure 7:
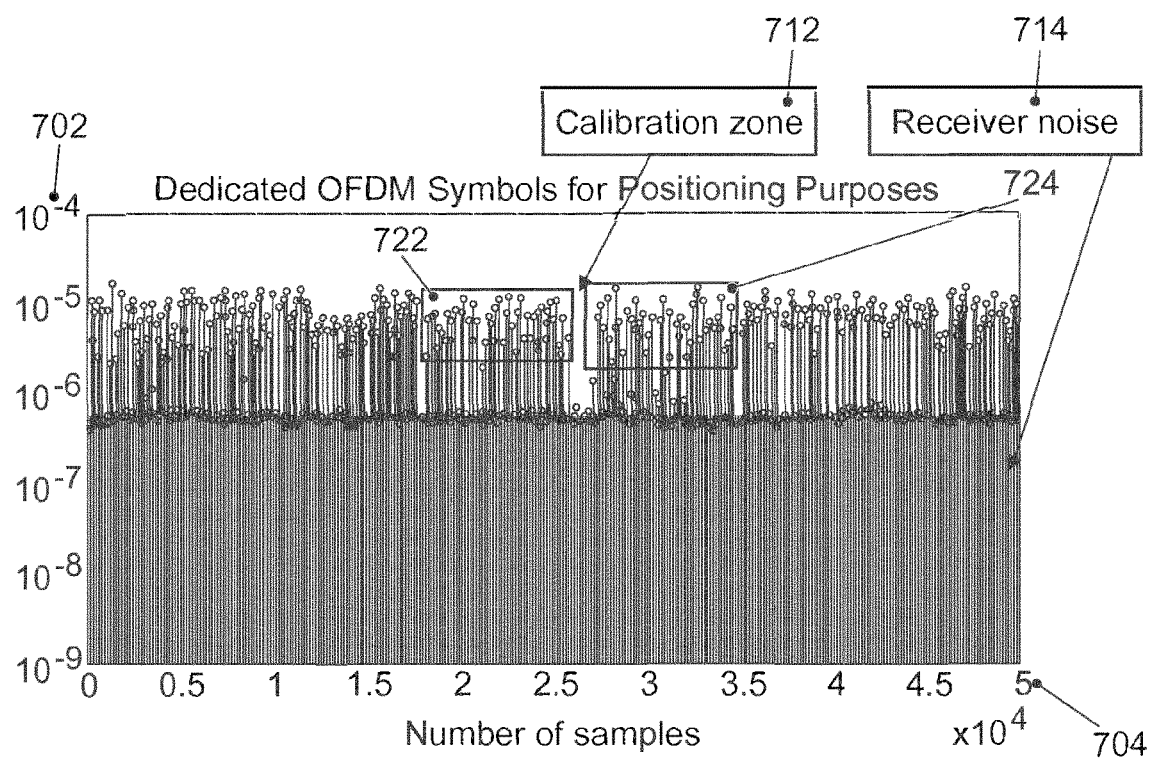
FIG. 7 shows a schematic diagram of a received downlink signal comprising one or more positioning symbols.

FIG. 7 shows a schematic diagram of a received downlink signal comprising one or more positioning symbols. The y-axis 702 shows the amplitude of received IQ (In-phase/Quadrature) samples, and the x-axis 704 shows the number of samples. The solid portion 714 shows the receiver noise. The marked portions 722; 724 show the line of sight components of the non-zero samples of the first and the second positioning symbol. The gap between the line of sight components of the non-zero samples of the first and the second positioning symbol forms calibration zone 712, which is caused by the cyclic prefix of the second positioning symbol. In the above diagram, the first and second positioning symbol are arranged at OFDM symbols 3 and 4, respectively, of a subframe of an LTE frame. FIG. 7 shows the first subframe of an LTE frame where the OFDM symbols 3 and 4 are dedicated for positioning purposes. The used signal bandwidth is B=1.4 MHz. A maximum excess delay is set to $$\Delta\tau_{max} = \frac{140 \text{ m}}{c}$$

and the time delay difference between the LOS signal and the fastest signal is $$\Delta\tau = \frac{8 \text{ m}}{c}$$

and is 10 dB weaker than the LOS signal. Up to 10 multipath signals are considered based on the WINNER 2 B1 LOS channel model. The ADC (Analog to Digital Converter) sampling rate is equal to $f_s$=122.88 MHz.

Assuming that the heights of the UCA on the transportation vehicle and of the eNodeB are known, the distance to the eNodeB may be easily calculated. Investigations showed that a positioning accuracy up to 20 cm are feasible within a radius of 50 m around an urban traffic intersection.

At least some exemplary embodiments relate to a slicing based In-Situ calibration of multi-channel receiving systems.

Receiving channels in multi-channel receiving systems based on UCA antennas may be calibrated in amplitude and in phase in situ. In-Situ means when the communication is ongoing, e.g., LTE downlink communications. Phase and amplitude drifts may lead into large errors in the AOA estimation, which may in turn negatively affect the distance estimation based on the elevation AOA as described before.

Figure 8:
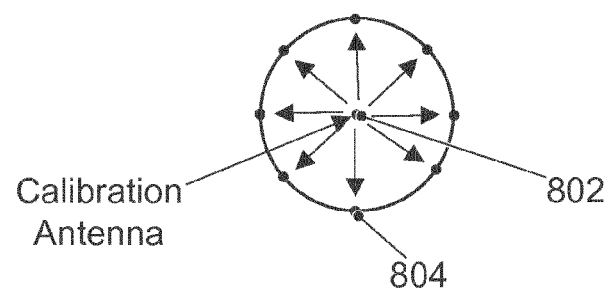
FIG. 8 shows a schematic diagram of a Uniform Circular Array Antenna and a calibration antenna.

At least some exemplary embodiments may be based on using an UCA antenna (e.g., the first antenna module) with N receiving antennas and one transmission antenna (e.g., the second antenna module) located at the center of the UCA. FIG. 8 shows a schematic diagram of an Uniform Circular Array Antenna and a calibration antenna. In FIG. 8, antenna 802 is the calibration antenna, and the antennas 804 form the UCA. A calibration signal (e.g., the local calibration signal) may be sent from the calibration antenna located at the center of the UCA to all receiving antennas of the UCA. The calibration signals may be sent on the same downlink frequency used for the communications between the multi-channel receiving systems and the eNodeB.

The approach may be to send the calibration signals (e.g., the local calibration signal) in the calibration periods created in a positioning slice (e.g., between positioning symbols of the one or more positioning symbols). The calibration periods may denote the baseband zone on the receiver where only thermal noise is available. This may be the zone between two consecutive OFDM symbols of the positioning slice. A matching filter algorithm may be used on the multi-channel receiver, which may use the known calibration signal to estimate the drift coefficients and to compensate them. Sending calibration signals with 20 dB higher than the thermal noise for a signal bandwidth of 1.4 MHz in a LTE downlink LTE system may allow for perfect calibration of the multi-channel receiving system and enable highly accurate AOA estimation and hence distance estimation based on the AOA elevation.

More details and properties of the method and concept are mentioned in connection with the proposed concept or one or more examples described above (e.g., FIG. 1a to 2b). The method/concept may comprise one or more additional optional features corresponding to one or more facets of the proposed concept or one or more examples described above or below.

As already mentioned, in exemplary embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and exemplary embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 Apparatus
12 Interface
14 Control module
16 Transceiver module
20 Apparatus
22 Interface
24 Control Module
26 Transceiver module
100 Mobile transceiver
110 Receiving a downlink signal
120 Identifying a line of sight component
130 Determining information related to a location
132 Determining an angle of arrival
134 Determining a location
136 Determining a distance
140 Determining information related to a time/phase synchronization
150 Transmitting a local calibration signal
152 Determining a transmission power
160 Receiving the local calibration signal
170 Calibrating the reception of the downlink signal
200 Base station transceiver
210 Generating one or more positioning symbols
220 Transmitting a downlink signal
230 Generating a cyclic prefix
240 Repeating a transmission
310 First base station
320 Second base station
330 Transportation vehicle
410 LTE base station
420 Point, at which the angle of arrival is to be determined
430 Transportation vehicle
502 LTE frame
504 Sub-Frame
506 First sub-frame
508 Sixth sub-frame
510 Cell-specific reference signal
512 Primary synchronization signal
514 Secondary synchronization signal
516 Positioning slices
602 Bit source block
604 Data modulation block
606 OFDM modulation block
608 Slicing controller block
610 Slicing configuration block
612 Block for adding a cyclic prefix
614 RF block
616 Antenna module
702 y-axis
704 x-axis
712 Calibration zone
714 Receiver noise
722 First positioning symbol
724 Second positioning symbol
802 Calibration antenna
804 Uniform Circular Array antennas

The invention claimed is:

1. A method for a mobile transceiver for a mobile communication system the method comprising:
receiving a downlink signal from a base station transceiver of the mobile communication system via a downlink data channel, the downlink signal being received using a plurality of slots of the downlink data channel,
wherein a plurality of symbols are received in each slot of the plurality of slots,
wherein the downlink signal comprises one or more positioning symbols,
wherein the plurality of symbols of at least some slots comprise the one or more positioning symbols,
wherein the one or more positioning symbols comprise a first positioning symbol,
wherein at least the first positioning symbol is based on a plurality of samples in a time domain to be transmitted by the base station transceiver
wherein the plurality of samples comprises one or more sequences of zero-value samples and one or more non-zero-value samples following the one or more sequences of zero-value samples;
identifying a line of sight component of at least the first positioning symbol of the downlink signal based on processing the one or more non-zero-value samples, wherein the line of sight component is distinguishable due to the one or more sequences of zero-value samples; and
determining information related to a location of the mobile transceiver based on the one or more non-zero-value samples received within the line of sight component of at least the first positioning symbol.

2. The method of claim 1, wherein the determining of the information related to the location of the mobile transceiver comprises determining an angle of arrival of the line of sight component of at least the first positioning symbol of the downlink signal based on the one or more non-zero-value samples and determining the location of the mobile transceiver based on the angle of arrival of the line of sight component.

3. The method of claim 1, wherein the one or more positioning symbols form a positioning slice, wherein the positioning slice is suitable for a physical layer of the mobile communication system wherein the positioning slice is based on the plurality of samples in a time domain to be transmitted by the base station transceiver comprising the one or more sequences of zero-value samples and the one or more non-zero-value samples following the one or more sequences of zero-value samples.

4. The method of claim 1, further comprising determining information related to a time and/or phase synchronization between the mobile transceiver and the base station transceiver based on the one or more non-zero-value samples received within the line of sight component of at least the first positioning symbol, wherein the determining of the information related to the location of the mobile transceiver comprises determining a distance between the mobile transceiver and the base station transceiver based on the information related to the time/and or phase synchronization.

5. The method of claim 1, wherein the one or more positioning symbols comprise a second positioning symbol, wherein the first positioning symbol and the second positioning symbol are consecutive symbols within the downlink signal, wherein the second positioning symbol is associated with a zero-value cyclic prefix, wherein the downlink signal is received via a first antenna module of the mobile transceiver, wherein the method further comprises:
transmitting a local calibration signal via a second antenna module of the mobile transceiver within a duration of the zero-value cyclic prefix of the second positioning symbol;
receiving the local calibration signal via the first antenna module; and
calibrating the reception of the downlink signal via the first antenna module based on the transmitted local calibration signal.

6. The method of claim 5, wherein:
the second positioning symbol is based on a further plurality of samples in the time domain to be transmitted by the base station transceiver
the further plurality of samples comprises a further sequence of zero-value samples located at an end of the further plurality of samples, so that the cyclic prefix associated with the second positioning symbol is a zero-value cyclic prefix, and/or the second positioning symbol is based on a further plurality of samples in the time domain to be transmitted by the base station transceiver,
the further plurality of samples comprises the one or more sequences of zero-value samples and the one or more non-zero value samples following the one or more sequences of zero-value samples, and
the information related to the location of the mobile transceiver is further based on the one or more non-zero-value samples received within the line of sight component of the second positioning symbol.

7. The method of claim 5, further comprising determining a transmission power for the local calibration signal,
wherein the transmission power for the local calibration signal is at least 15 dB and at most 20 dB above a receiver noise power corresponding to a minimal deployed bandwidth of a downlink system of the base station transceiver within a frequency band of the local calibration signal, and/or wherein the local calibration signal is transmitted and received during the duration of the zero-value cyclic prefix within a frequency band of the downlink data channel, so that a demodulation of other symbols of the downlink signal is unaffected by the local calibration signal.

8. The method of claim 1, wherein:
a duration between samples of the one or more non-zero samples is based on a delay spread of the downlink data channel between the base station transceiver and the mobile transceiver, and/or the length of individual sequences of the one or more sequences of zero-value samples is based on at least one element of the group of a maximal excess delay of the downlink signal, a symbol duration, and a number of samples comprised within the plurality of samples.

9. The method of claim 1, wherein:
the one or more positioning symbols are integrated within the downlink signal as a positioning slice, wherein the downlink signal is an orthogonal frequency division multiplexing-based downlink signal, and/or
the downlink data channel is a Physical Downlink Shared Channel, (PDSCH) of the mobile communication system, and/or
the first antenna module is a Uniform Circular Array antenna module.

10. A method for a base station transceiver for a mobile communication system, the method comprising:
generating one or more positioning symbols for a downlink signal,
wherein the one or more positioning symbols comprise a first positioning symbol,
wherein at least the first positioning symbol is based on a plurality of samples in a time domain,
wherein the plurality of samples comprises one or more sequences of zero-value samples and one or more non-zero-value samples following the one or more sequences of zero-value samples; and
transmitting the downlink signal comprising the one or more positioning symbols to a mobile transceiver via a downlink data channel of the mobile communication system the downlink signal being transmitted using a plurality of slots of the downlink data channel,
wherein a plurality of symbols are transmitted in each slot of the plurality of slots,
wherein the plurality of symbols of at least some slots comprise the one or more positioning symbols, and
wherein the one or more positioning symbols are generated such that a line-of-sight component of at least the first positioning symbol of the downlink signal is identifiable, by the mobile transceiver, based on the one or more sequences of zero-value samples.

11. The method of claim 10, wherein the one or more positioning symbols comprise a second positioning symbol,
wherein the first positioning symbol and the second positioning symbol are consecutive symbols within the downlink signal, and
wherein the second positioning symbol is associated with a zero-value cyclic prefix, wherein the downlink signal comprises the second positioning symbol with the zero-value cyclic prefix.

12. The method of claim 10, the method further comprising
periodically repeating a transmission of the one or more positioning symbols within the downlink signal,
wherein the second positioning symbol is repeated at least once every second, and/or
wherein the downlink signal is an orthogonal frequency division multiplexing-based downlink signal, wherein the one or more positioning symbols are built within the downlink signal after a orthogonal frequency division multiplexing-based modulation and before a generation of cyclic prefixes for the symbols of the downlink signal.

13. A non-transitory computer program product having a program code for performing the method of claim 1, when the computer program is executed on a computer, a processor, or a programmable hardware component.

14. An apparatus for a mobile transceiver for a mobile communication system the apparatus comprising:
an interface for communicating with a transceiver module of the mobile transceiver; and
a control module configured to:
receive a downlink signal from a base station transceiver of the mobile communication system via a downlink data channel via the transceiver module and the interface, the downlink signal being received using a plurality of slots of the downlink data channel,
wherein a plurality of symbols are received in each slot of the plurality of slots,
wherein the downlink signal comprises one or more positioning symbols,
wherein the plurality of symbols of at least some slots comprise the one or more positioning symbols, wherein the one or more positioning symbols comprise a first positioning symbol,
wherein at least the first positioning symbol is based on a plurality of samples in a time domain to be transmitted by the base station transceiver, and
wherein the plurality of samples comprises one or more sequences of zero-value samples and one or more non-zero-value samples following the one or more sequences of zero-value samples,
identify a line of sight component of at least the first positioning symbol of the downlink signal based on processing the one or more non-zero-value samples, wherein the line of sight component is distinguishable due to the one or more sequences of zero-value samples, and
determine information related to a location of the mobile transceiver based on the one or more non-zero-value samples received within the line of sight component of at least the first positioning symbol.

15. An apparatus for a base station transceiver for a mobile communication system the apparatus comprising:
an interface for communicating with a transceiver module of a mobile transceiver; and
a control module configured to:
generate one or more positioning symbols for a downlink signal,
wherein the one or more positioning symbols comprise a first positioning symbol,
wherein at least the first positioning symbol is based on a plurality of samples in a time domain,
wherein the plurality of samples comprises one or more sequences of zero-value samples and one or more non-zero-value samples following the one or more sequences of zero-value samples, and
transmit the downlink signal comprising the one or more positioning symbols to a mobile transceiver via a downlink data channel of the mobile communication system via the interface and the transceiver module, the downlink signal being transmitted using a plurality of slots of the downlink data channel,
wherein a plurality of symbols are transmitted in each slot of the plurality of slots,
wherein the plurality of symbols of at least some slots comprise the one or more positioning symbols, and
wherein the one or more positioning symbols are generated such that a line-of-sight component of at least the first positioning symbol of the downlink signal is identifiable, by the mobile transceiver, based on the one or more sequences of zero-value samples.

16. A non-transitory computer program product having a program code for performing the method of claim 10, when the computer program is executed on a computer, a processor, or a programmable hardware component.

* * * * *